(12) United States Patent
Yoshimi (10) Patent No.: US 8,917,376 B2
(45) Date of Patent: Dec. 23, 2014

(54) POLARIZING PLATE EXHIBITING A HIGH CONTRAST RATIO AND LIQUID CRYSTAL DISPLAY APPARATUS

(71) Applicant: Nitto Denko Corporation, Ibaraki (JP)

(72) Inventor: Hiroyuki Yoshimi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/860,192

(22) Filed: Apr. 10, 2013

(65) Prior Publication Data

US 2013/0229602 A1 Sep. 5, 2013

Related U.S. Application Data

(62) Division of application No. 12/440,475, filed as application No. PCT/JP2007/067796 on Sep. 13, 2007, now abandoned.

(30) Foreign Application Priority Data

Oct. 5, 2006 (JP) ................. 2006-273762

(51) Int. Cl.
 *G02B 5/30* (2006.01)
 *G02F 1/1335* (2006.01)
(52) U.S. Cl.
 CPC ........ *G02F 1/133528* (2013.01); *G02B 5/3016* (2013.01); *G02B 5/305* (2013.01); *G02F 1/133536* (2013.01)
 USPC .......................................................... 349/194
(58) Field of Classification Search
 USPC .......................................................... 349/194
 See application file for complete search history.

(56) References Cited

U.S. PATENT DOCUMENTS

| 6,252,640 B1 | 6/2001 | Kim et al. |
| 6,888,592 B2 * | 5/2005 | Kitagawa et al. ............... 349/96 |
| 7,110,177 B2 | 9/2006 | Sugino et al. |

(Continued)

FOREIGN PATENT DOCUMENTS

| JP | 9-269504 A | 10/1997 |
| JP | 2004-341494 A | 12/2004 |
| JP | 2005-266635 A | 9/2005 |

(Continued)

OTHER PUBLICATIONS

Taiwanese Office Action dated Nov. 11, 2011, issued in corresponding Taiwanese Patent Application No. 096137304, with English Translation.

(Continued)

*Primary Examiner* — Akm Enayet Ullah
(74) *Attorney, Agent, or Firm* — Westerman, Hattori, Daniels & Adrian, LLP (57) ABSTRACT

An object of the present invention is to provide a thin polarizing plate exhibiting a high contrast ratio. A polarizing plate of the present invention includes: a polarizer; a first protective layer provided on one side of the polarizer; and a second protective layer provided on the other side of the polarizer, wherein the first protective layer has a function of separating incident light into two polarized light components perpendicular to each other, transmitting one polarized light component, and reflecting the other polarized light component. Such a polarizing plate can exhibit a high contrast ratio, for example, in the case of being used in a liquid crystal display apparatus.

18 Claims, 2 Drawing Sheets

(56) References Cited

U.S. PATENT DOCUMENTS

| | | |
|---|---|---|
| 7,236,222 B2 | 6/2007 | Yoda et al. |
| 7,391,935 B2 * | 6/2008 | Kawahara et al. .............. 385/11 |
| 7,852,436 B2 | 12/2010 | Shimizu et al. |
| 2004/0101660 A1 | 5/2004 | Kaieda et al. |
| 2005/0231839 A1 | 10/2005 | Murakami et al. |
| 2006/0001799 A1 | 1/2006 | Kawamoto et al. |
| 2006/0029784 A1 | 2/2006 | Doan et al. |
| 2007/0139773 A1 | 6/2007 | Kawamoto et al. |
| 2007/0285777 A1 | 12/2007 | Toyoshima et al. |

FOREIGN PATENT DOCUMENTS

| | | |
|---|---|---|
| TW | 200612118 A | 4/2006 |
| TW | 200632388 A | 9/2006 |

OTHER PUBLICATIONS

Chinese Office Action dated Mar. 31, 2012, issued in corresponding Chinese Patent Application No. 200780037300.5, (English translation, 17 pages).

International Search Report of PCT/JP2007/067796, mailing date of Dec. 11, 2007.

* cited by examiner

POLARIZING PLATE EXHIBITING A HIGH CONTRAST RATIO AND LIQUID CRYSTAL DISPLAY APPARATUS

CROSS-REFERENCE OF RELATED APPLICATIONS

This application is a Divisional of application Ser. No. 12/440,475, filed Mar. 9, 2009, which is a 371 of International Application No. PCT/JP2007/067796 filed on Sep. 13, 2007, and which claims priority of Japanese Patent Application No. 2006-273762, filed Oct. 5, 2006, the entire contents of which is incorporated herein by reference.

TECHNICAL FIELD

The present invention relates to a polarizing plate including a protective layer that has a function of separating incident light into two polarized light components perpendicular to each other, and transmitting one polarized light component and reflecting the other polarized light component.

BACKGROUND ART

A liquid crystal display apparatus (hereinafter, referred to as "LCD") is a device for displaying characters and images, using electrooptical properties of liquid crystal molecules, and has been widely used for cell phones, notebook computers, liquid crystal televisions, and the like. The LCD generally uses a liquid crystal panel, in which polarizing plates are arranged on both sides of a liquid crystal cell, and can display a black image under no voltage application, for example, in a normally black mode (e.g., see Patent Document 1). Recently, as the definition of the LCD has been increased, and the range of applications thereof has been enlarged, there is a demand for a thin polarizing plate exhibiting a high contrast ratio, capable of drawing characters and images more clearly.

Patent Document 1: JP 9-269504 A

DISCLOSURE OF THE INVENTION

Problem to be Solved by the Invention

An object of the present invention is to provide a thin polarizing plate exhibiting a high contrast ratio.

Means for Solving the Problems

As a result of an intensive study, the inventors have found that the above-described object can be achieved according to the polarizing plate described below so as to complete the present invention.

That is, a polarizing plate of the present invention includes: a polarizer; a first protective layer provided on one side of the polarizer; and a second protective layer provided on the other side of the polarizer, wherein the first protective layer has a function of separating incident light into two polarized light components perpendicular to each other, transmitting one polarized light component, and reflecting the other polarized light component.

In a preferred embodiment, a transmission axis direction of the polarizer and a transmission axis direction of the first protective layer are substantially parallel to each other.

In a preferred embodiment, the polarizer includes a stretched film of a polyvinyl alcohol-based resin containing a dichroic pigment.

In a preferred embodiment, the polarizer includes a solidified layer or a cured layer of an aligned lyotropic liquid crystal.

In a preferred embodiment, the lyotropic liquid crystal contains an azo-based pigment, an anthraquinone-based pigment, a perylene-based pigment, an indanthrone-based pigment, an imidazole-based pigment, or a mixture thereof.

In a preferred embodiment, the first protective layer includes a laminate containing a thermoplastic resin layer (A) and a thermoplastic resin layer (B).

In a preferred embodiment, the first protective layer includes the thermoplastic resin layer (A) and the thermoplastic resin layer (B) provided alternately.

In a preferred embodiment, the thermoplastic resin layer (A) substantially exhibits anisotropy, and the thermoplastic resin layer (B) substantially exhibits isotropy.

In a preferred embodiment, an in-plane birefringent index ($\Delta n_{xy}[590]$) at a wavelength of 590 nm of the thermoplastic resin layer (A) is 0.05 or more.

In a preferred embodiment, a refractive index ($ny_A$) in a fast axis direction of the thermoplastic resin layer (A) and a refractive index ($ny_B$) in a fast axis direction of the thermoplastic resin layer (B) are substantially the same.

In a preferred embodiment, the thermoplastic resin layer (A) contains a polyethylene terephthalate-based resin, a polytrimethylene terephthalate-based resin, a polybutylene terephthalate-based resin, a polyethylene-naphthalate-based resin, a polybutylene naphthalate-based resin, or a mixture thereof.

In a preferred embodiment, the thermoplastic resin layer (B) contains a polystyrene-based resin, a polymethyl methacrylate-based resin, a polystyrene glycidyl methacrylate-based resin, or a mixture thereof.

In a preferred embodiment, an in-plane retardation value ($Re[590]$) at a wavelength of 590 nm of the second protective layer is 10 nm to 400 nm. In a preferred embodiment, a thickness direction retardation value ($Rth[590]$) at a wavelength of 590 nm of the second protective layer is 10 nm to 800 nm.

In a preferred embodiment, the second protective layer contains at least one kind of resin selected from the group consisting of a cellulose-based resin, a norbornene-based resin, a polyimide-based resin, a polyester-based resin, and an acrylic resin.

In a preferred embodiment, the polarizing plate further includes an adhesion layer on a side of the second protective layer opposite to a side having the polarizer. In a preferred embodiment, the polarizing plate further includes a retardation layer on a side of the second protective layer opposite to a side having the polarizer. In a preferred embodiment, the retardation layer has a function of compensating a liquid crystal cell optically.

According to another aspect of the present invention, a liquid crystal display apparatus is provided. The liquid crystal display apparatus includes the polarizing plate according to any one of claims 1 to 18.

Effects of the Invention

In the polarizing plate of the present invention, the second protective layer has a function of separating incident light into two polarized light components perpendicular to each other, and transmitting one polarized light component and reflecting the other polarized light component. Therefore, the polarizing plate of the present invention is thinner than a conventional polarizing plate, and when the polarizing plate of the present invention is used in a liquid crystal display apparatus, much higher contrast ratio may be obtained.

DESCRIPTION OF SYMBOLS 1 absorption axis direction
2 transmission axis direction
3 reflection axis direction
4 transmission axis direction
5 slow axis direction
10 polarizer
21 first protective layer
22 second protective layer
50 polarizing plate

BEST MODE FOR CARRYING OUT THE INVENTION

Definitions of Terms and Symbols

Definitions of terms and symbols in the specification of the present invention are described below.

(1) Transmittance of a polarizing plate

Transmittance (T) refers to a Y value of tristimulus value based on the two degree field of JIS Z 8701-1995.

(2) Refractive index (nx, ny, nz):

Symbol "nx" refers to a refractive index in a direction providing a maximum in-plane refractive index (that is, a slow axis direction), symbol "ny" refers to a refractive index in a direction perpendicular to the slow axis in the plane (that is, a fast axis direction), and symbol "nz" refers to a refractive index in a thickness direction.

(3) In-plane retardation value:

The term "in-plane retardation value (Re[$\lambda$])" refers to an in-plane retardation value measured at 23° C. by using light of a wavelength of $\lambda$ nm. Re[$\lambda$] is obtained from Re[$\lambda$]=(nx−ny)×d, where d (nm) represents a thickness of a sample.

(4) Thickness direction retardation value:

The term "thickness direction retardation value (Rth[$\lambda$])" refers to a thickness direction retardation value measured at 23° C. by using light of a wavelength of $\lambda$ nm. Rth[$\lambda$] is obtained from Rth[$\lambda$]=(nx−nz)×d, where d (nm) represents a thickness of a sample.

(5) Thickness direction birefringent index:

The term "thickness direction birefringent index ($\Delta n_{xz}$[$\lambda$])" refers to a value calculated from an expression; Rth[$\lambda$]/d. In the expression, Rth[$\lambda$] represents a thickness direction retardation value measured at 23° C. by using light of a wavelength of $\lambda$ nm and d (nm) represents a thickness of a film.

(6) Nz coefficient:

The term "Nz coefficient" refers to a value calculated from an expression; Rth[590]/Re[590].

(7) In the present specification, the phrase "nx=ny" or "ny=nz" includes not only a case where these are exactly equal but also a case where these are substantially equal. Thus, for example, the description "nx=ny" includes a case where Re[590] is less than 10 nm.

(8) In the present specification, the phrase "substantially perpendicular" includes a case where an angle between two optical axes is 90°±2°, preferably 90°±1°. The phrase "substantially parallel" includes a case where an angle between two optical axes is 0°±2°, preferably 0°±1°.

(9) In the present specification, for example, the subscript "1" represents a first protective layer and the subscript "2" represents a second protective layer.

<A. Outline of Polarizing Plate>

Figure 1:
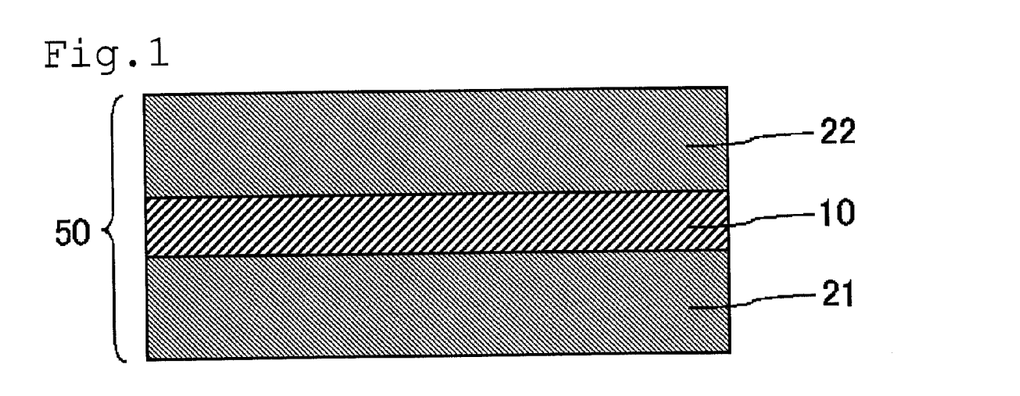
[FIG. 1] A schematic cross-sectional view of a polarizing plate according to a preferred embodiment of the present invention.

FIG. 1 is a schematic cross-sectional view of a polarizing plate of the present invention. A polarizing plate 50 includes a polarizer 10, a first protective layer 21 provided on one side of the polarizer 10, and a second protective layer 22 provided on the other side of the polarizer 10. The first protective layer 21 has a function of separating incident light into two polarized light components perpendicular to each other, and transmitting one polarized light component and reflecting the other polarized light component.

The thickness of the polarizing plate is preferably 10 μm to 500 μm, and more preferably 30 μm to 300 μm.

For a practical use, any adhesion layer may be provided in between the constituent members of the polarizing plate 50. The term "adhesion layer" refers to a layer that connects surfaces of adjacent members and integrate them with a practically sufficient adhesion strength and for an adhesion time. Examples of a material for forming the adhesion layer include an adhesive, a pressure-sensitive adhesive, and an anchor coat agent. The adhesion layer may have a multi-layered structure in which an anchor coat agent is formed on the surface of an adherend and an adhesive layer or a pressure-sensitive adhesive layer is formed thereon. Further, the adhesion layer may be a thin layer (which may be referred to as hair line) which cannot be recognized with naked eyes.

Figure 2:
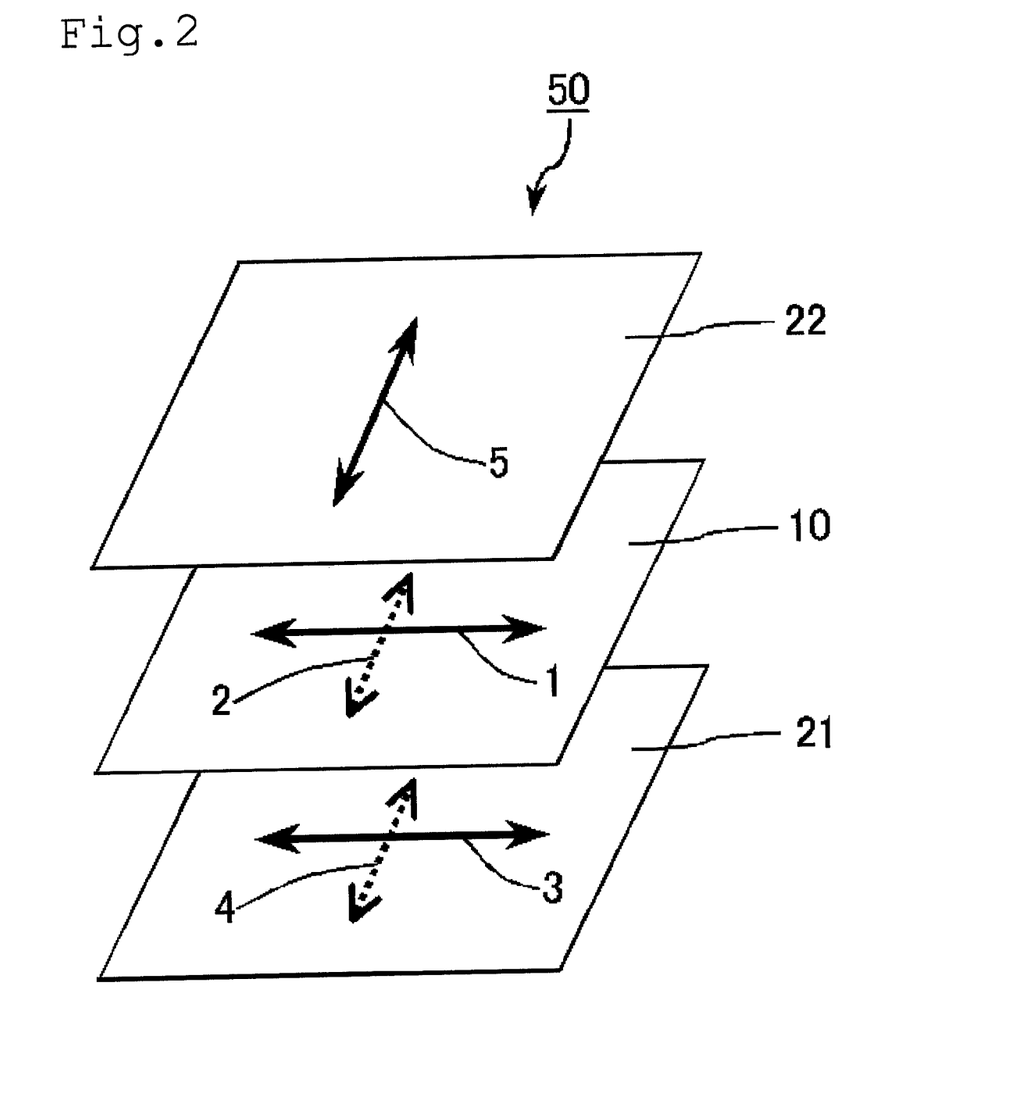
[FIG. 2] A schematic perspective view of a polarizing plate according to a preferred embodiment of the present invention.

FIG. 2 is a schematic perspective view of the polarizing plate of the present invention in a preferred embodiment. The first protective layer 21 has an axis direction (transmission axis direction 4) in which one of the two separated polarized light components perpendicular to each other is transmitted and an axis direction (reflection axis direction 3) in which the other polarized light component is reflected. The polarizer 10 has an absorption axis direction 1 and a transmission axis direction 2. The second protective layer has a slow axis direction 22. The transmission axis direction 2 of the polarizer 10 and the transmission axis direction 4 of the first protective layer 21 are substantially parallel to each other. In the illustrated example, the absorption axis direction 1 of the polarizer 10 and the slow axis direction 5 of the second protective layer 22 are substantially perpendicular to each other. However, they may be substantially parallel to each other or may have a relationship in which they are neither perpendicular nor parallel. Hereinafter, constituent members of the present invention will be described in detail; however, the present invention is not limited to only the following particular embodiments.

<B. Polarizer>

As the polarizer used in the present invention, any suitable one may be selected. Preferably, the polarizer has a function of separating incident light into two polarized light components perpendicular to each other, and transmitting one polarized light component and absorbing the other polarized light component.

The light transmittance (T) of the polarizer is preferably 40% to 45%, more preferably 41% to 45%. The polarization degree (P) of the polarizer is preferably 99% or more, more preferably 99.5% or more. By setting T and P in the above range, a liquid crystal display apparatus with a much higher contrast ratio may be obtained.

The light transmittance (T) and the polarization degree (P) may be determined by using a spectrophotometer "DOT-3" (product name, manufactured by Murakami Color Research Laboratory). The polarization degree may be determined by: measuring a parallel transmittance ($H_0$) and a perpendicular transmittance ($H_{90}$) of the polarizing plate; and using the following equation. Polarization degree (%)=$\{(H_0-H_{90})/(H_0+H_{90})\}^{1/2} \times 100$. The parallel transmittance ($H_0$) refers to a transmittance of a parallel laminate polarizing plate produced by laminating two identical polarizing plates such that respective absorption axes are parallel to each other. The perpendicular transmittance ($H_{90}$) refers to a transmittance of a perpendicular laminate polarizing plate produced by laminating two identical polarizing plates such that respective absorption axes are perpendicular to each other. The transmittance refers to a Y value of a tristimulus value based on a two-degree field of JIS Z 8701-1995.

In one embodiment, the polarizer is a stretched film of a polyvinyl alcohol-based resin containing a dichroic pigment. In the present specification, the "dichroic pigment" refers to a pigment whose transition moment in a major axis direction of the pigment molecule is larger than that in a minor axis direction, or whose transmission moment in a minor axis direction is larger than that in a major axis direction.

For example, as described in JP 2004-341515 A, the stretched film may be obtained by allowing a polymer film containing a polyvinyl alcohol-based resin as a main component to swell, and thereafter, stretching the polymer film 4 to 6 times the original length while dyeing the polymer film with a dichroic pigment.

The thickness of the stretched film of a polyvinyl alcohol-based resin containing a dichroic pigment is preferably 10 μm to 100 μm, and more preferably 10 μm to 50 μm.

Iodine, a dichroic dye, and the like may be exemplified as the dichroic pigment. Examples of the dichroic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

The content of the dichroic dye is preferably 1% by weight to 10% by weight. In the case where the dichroic dye is iodine, the content of iodine is preferably 1.5% by weight to 5.0% by weight. By setting the content of iodine in the polarizer in the above range, a transmittance and a polarization degree in preferred ranges may be obtained.

Preferably, the stretched film of a polyvinyl alcohol-based resin containing a dichroic dye further contains potassium and/or boron. The content of potassium is preferably 0.2% by weight to 1.0% by weight. The content of boron is preferably 0.5% by weight to 3.0% by weight. By setting the content of potassium and the content of boron in the above ranges, a polarizing plate with a transmittance in a preferred range and a high polarization degree may be obtained.

The polyvinyl alcohol-based resin may be obtained by saponifying a vinyl ester-based polymer obtained by polymerizing a vinyl ester-based monomer. The saponification degree of the polyvinyl alcohol-based resin is preferably 95.0% by mol to 99.9% by mol. The saponification degree may be obtained in accordance with JIS K 6726-1994. By using a polyvinyl alcohol-based resin having a saponification degree in the above range, a polarizer excellent in durability may be obtained.

In another embodiment, the polarizer is a solidified layer or cured layer of an aligned lyotropic liquid crystal. In the specification of the present invention, the term "lyotropic liquid crystal" refers to a liquid crystal that causes phase transition of isotropic phase/liquid crystal phase by concentration change of solute (liquid crystal compound) as a major factor. The term "solidified layer" refers to a layer obtained by cooling and solidifying a softened, molten, or solution-state liquid crystalline composition. The term "cured layer" refers to a layer obtained by cross-linking part or all of the liquid crystalline composition through heat, a catalyst, light, and/or radiation into an insoluble and infusible, or hardly soluble and hardly fusible state.

The solidified layer or cured layer of the aligned lyotropic liquid crystal is excellent in absorption dichroism, so that the solidified layer or cured layer may be formed thin. The thickness of the solidified layer or cured layer is preferably 0.1 μm to 10 μm, and more preferably 0.1 μm to 5 μm.

The solidified layer or cured layer of the aligned lyotropic liquid crystal may be obtained, for example, by mixing a lyotropic liquid crystal with a solvent (for example, water), preparing a solution exhibiting a nematic liquid crystal phase, and casting the solution onto the surface of a base, followed by drying.

The concentration of the solution may be appropriately adjusted in a range in which the solution exhibits a liquid crystal phase, depending upon the kind of a lyotropic liquid crystal to be used. The concentration of the lyotropic liquid crystal of the solution is preferably 5% by weight to 40% by weight.

Examples of a liquid crystal phase exhibited by the lyotropic liquid crystal in a solution state include a nematic liquid crystal phase, a smectic liquid crystal phase, and a cholesteric liquid crystal phase. The nematic liquid crystal phase is preferred. These liquid crystal phases may be checked and identified based on an optical pattern of a liquid crystal phase observed with a polarization microscope.

The lyotropic liquid crystal preferably absorbs light with any wavelength in the range of 400 nm to 780 nm. The lyotropic liquid crystal, for example, contains a dichroic pigment according to a desired absorption wavelength. Examples of the dichroic pigment include, according to classification by chemical structures, azo-based pigments, anthraquinone-based pigments, perylene-based pigments, indanthrone-based pigments, imidazole-based pigments, indigoid-based pigments, oxazine-based pigments, phthalocyanine-based pigments, triphenylmethane-based pigments, pyrazolone-based pigments, stilbene-based pigments, diphenylmethane-based pigments, naphthoquinone-based pigments, methocyanine-based pigments, quinophthalone-based pigments, xanthene-based pigments, alizarin-based pigments, acridine-based pigments, quinoneimine-based pigments, thiazole-based pigments, methine-based pigments, nitro-based pigments, and nitroso-based pigments. In the present invention, in order to obtain black polarizer, plural dichroic pigments having different adsorption spectra from one another are preferably mixed for use.

Preferably, the lyotropic liquid crystal contains azo-based pigments, anthraquinone-based pigments, perylene-based pigments, indanthrone-based pigments, imidazole-based pigments, or a mixture thereof. Such compounds have rigidity and anisotropy required for expressing a liquid crystal phase, exhibits a stable liquid crystal phase in a solution, and absorbs light in a wavelength region in a wide range of 400 nm to 780 nm.

Preferably, the lyotropic liquid crystal is a polycyclic compound containing a —$SO_3M$ group and/or a —COOM group (herein, M represents a counter ion). Particularly preferably, the lyotropic liquid crystal is a polycylic compound containing a —SO₃M group in order to enhance the solubility in water. The polycyclic compound becomes likely to form an association with a high order in a solution by containing a —SO₃M group and/or a —COOM group. Therefore, a film formed of such a solution also exhibits a high alignment property, and as a result, a polarizer excellent in optical properties may be obtained.

The above-mentioned M is a counter ion, and is preferably a hydrogen atom, an alkali metal atom, an alkaline-earth metal atom, a metal ion, or a substituted or unsubstituted ammonium ion. Examples of the metal ions include $Ni^{2+}$, $Fe^{3+}$, $Cu^{2+}$, $Ag^{+}$, $Zn^{2+}$, $Al^{3+}$, $Pd^{2+}$, $Cd^{2+}$, $Sn^{2+}$, $Co^{2+}$, $Mn^{2+}$, and $Ce^{3+}$. For example, in the case where a polarizer is formed of an aqueous solution, a group that enhances solubility in water is selected first as the M, and after the formation of a film, a water-insoluble or slightly-soluble group may substitute for the selected group so as to enhance the water resistance of the polarizer.

If the polycyclic compound is used, a polarizer having a transmission axis substantially parallel to an application direction may be produced. Such a polarizer may be attached to the first protective layer having a transmission axis direction substantially parallel to a stretching direction by roll-to-roll, so that the productivity of a polarizing plate may be enhanced greatly.

As a method of introducing a sulfone group into the polycyclic compound (sulfonation), for example, there is a method of allowing sulfuric acid, chlorosulfonic acid, or fuming sulfuric acid to act on an organic compound, and substituting a sulfonic group for hydrogen at a core. A salt of the organic compound is obtained by substituting monovalent cation such as a lithium ion, a sodium ion, a potassium ion, a cesium ion, or an ammonium ion for a dissociable hydrogen atom in the acid group.

As the lyotropic liquid crystal, in addition to the above-mentioned compounds, compounds described in, for example, JP 2006-047966 A, JP 2005-255846 A, JP 2005-154746 A, JP 2002-090526 A, JP 08-511109 A, JP 2004-528603 A, JP 2004-528603 A, JP 2004-528603 A, and the like may be used.

<C. First Protective Layer>

The first protective layer used in the present invention has a function of separating incident light into two polarized light components perpendicular to each other, and transmitting one polarized light component and reflecting the other polarized light component. Further, the first protective layer can prevent a polarizer from shrinking or expanding. The first protective layer has an axis direction (transmission axis direction) in which one polarized light component of the two separated polarized light components perpendicular to each other is transmitted and an axis direction (reflection axis direction) in which the other polarized light component is reflected.

The first protective layer is used for enhancing a brightness (white brightness) in the case where a white image is displayed on a liquid crystal display apparatus. A conventional polarizing plate can increase a white brightness by using a brightness enhancing film; however, at the same time, a brightness in the case where a black image is displayed (black brightness) is increased, and consequently, a high contrast ratio in a front direction cannot be obtained. The polarizing plate with a configuration of the present invention can minimize the increase in a black brightness while increasing a white brightness, so that a high contrast ratio in a front direction may be obtained.

A reflectivity ($R_{1x}[590]$) of the first protective layer in the reflection axis direction at a wavelength of 590 nm is preferably 60% or more, and more preferably 70% or more. A reflectivity ($R_{1y}[590]$) of the first protective layer in the transmission axis direction is preferably less than 50%, and more preferably 30% or less. The reflectivity in the reflection axis direction and the transmission axis direction is measured with a spectrophotometer having an integrating sphere accessory and a polarizer under the condition that the reflection axis direction and the transmission axis direction of the first protective layer are respectively provided so as to be parallel to a polarization electric field vector of incident light.

A transmittance ($T_{1y}[590]$) of the first protective layer in the transmission axis direction is preferably 60% or more, and more preferably 70% or more. The transmittance ($T_{1x}[590]$) of the first protective layer in the reflection axis direction is preferably less than 50%, and more preferably 30% or less. The transmittance in the transmission axis direction and the reflection axis direction is measured with a spectrophotometer having an integrating sphere accessory and a polarizer under the condition that the transmission axis direction and the reflection axis direction of the first protective layer are respectively provided so as to be parallel to a polarization electric field vector of incident light.

The first protective layer preferably is allowed to adhere to the polarizer via an adhesion layer. Preferably, the transmission axis direction of the polarizer and the transmission axis direction of the first protective layer are substantially parallel to each other. That is, the absorption axis direction of the polarizer and the transmission axis direction of the first protective layer are substantially perpendicular to each other.

Preferably, the first protective layer is a laminate including a thermoplastic resin layer (A) and a thermoplastic rein layer (B). Typically, the first protective layer is a layer in which the thermoplastic resin layers (A) and the thermoplastic resin layers (B) are placed alternately (ABABAB . . . ). The number of the layers constituting the first protective layer is preferably 10 to 900, and more preferably 50 to 700. The total thickness of the first protective layer is preferably 20 μm to 800 μm.

Preferably, the thermoplastic resin layer (A) exhibits anisotropy optically. A birefringent index ($\Delta n_A$) in a plane of the thermoplastic resin (A) is preferably 0.05 or more, more preferably 0.1 or more, and particularly preferably 0.15 or more. From the viewpoint of optical uniformity, the upper limit value of the $\Delta n_A$ is preferably 0.2. Herein, the $\Delta n_A$ represents a difference ($nx_A - ny_A$) between a refractive index ($nx_A$) in a slow axis direction and a refractive index ($ny_A$) in a fast axis direction.

The thermoplastic resin layer (B) preferably exhibits isotropy optically. A birefringent index ($\Delta n_B$) in a plane of the thermoplastic resin (B) is preferably $5 \times 10^{-4}$ or less, $1 \times 10^{-4}$ or less, and particularly preferably $0.5 \times 10^{-4}$ or less. The lower limit value of the $\Delta n_E$ is preferably $0.01 \times 10^{-4}$. Herein the $\Delta n_B$ represents a difference ($nx_B - ny_B$) between $nx_B$ (refractive index in a slow axis direction) and $ny_B$ (refractive index in a fast axis direction).

$ny_A$ of the thermoplastic resin layer (A) and $ny_B$ of the thermoplastic resin layer (B) preferably are substantially the same. The absolute value of a difference between $ny_A$ and $ny_B$ is preferably $5 \times 10^{-4}$ or less, $1 \times 10^{-4}$ or less, and particularly preferably $0.5 \times 10^{-4}$ or less. The first protective layer having such optical properties is excellent in a function of reflecting a polarized light component. In the case where the thermoplastic resin layer (B) is completely isotropic, the $ny_B$ and $ny_A$ represent refractive indices in the same direction.

The first protective layer is produced by co-extruding two kinds of resins and stretching the extruded film, for example, as described in JP 2000-506989 A. According to such a method, the thermoplastic resin layer (A) exhibits anisotropy optically, and a slow axis substantially parallel to the stretching direction is expressed. Then, by setting stretching conditions appropriately, the $ny_A$ of the thermoplastic resin layer (A) and the $ny_B$ of the thermoplastic resin layer (B) may be set to be substantially the same. Consequently, a layer having a reflection axis parallel to the stretching direction may be produced.

As a resin forming the thermoplastic resin layer (A), any suitable one may be selected. The thermoplastic resin layer (A) preferably contains a polyethylene terephthalate-based resin, a polytrimethylene terephthalate-based resin, a polybutylene terephthalate-based resin, a polyethylene naphthalate-based resin, a polybutylene naphthalate-based resin, or a mixture thereof. These resins are excellent in an expression property of a birefringence by stretching and stability of birefringence after stretching.

As the thermoplastic resin layer (B), any suitable one may be selected. The thermoplastic resin layer (B) preferably contains a polystyrene-based resin, a polymethyl methacrylate-based resin, a polystyrene glycidyl methacrylate-based resin, or a mixture thereof. In order to enhance a refractive index, a halogen group such as chlorine, bromine, and iodine may be introduced into the resin. Alternatively, the resin may contain any additive so as to adjust a refractive index.

As the first protective layer, a commercially available brightness enhancing film may be used as it is. An example of the commercially available brightness enhancing film includes Vikuiti DBEF series manufactured by Sumitomo 3M Ltd., and the like.

<D. Second Protective Layer>

The second protective layer used in the present invention is provided on a side of the polarizer opposite to the side where the first protective layer is provided. The second protective layer can prevent the polarizer from shrinking and expanding. The second protective layer is preferably adhered to the polarizer via an adhesion layer.

The second protective layer may be a single layer or a laminate formed of a plurality of layers. The thickness of the second protective layer is preferably 10 μm to 200 μm. The transmittance ($T_2$[590]) at a wavelength of 590 nm of the second protective layer is preferably 90% or more.

In-plane and thickness direction retardation values of the second protective layer may be set appropriately depending upon the purpose. The in-plane retardation value ($Re_2$[590]) at a wavelength of 590 nm of the second protective layer is preferably 10 nm to 400 nm, and more preferably 40 nm to 400 nm. The thickness direction retardation value ($Rth_2$[590]) at a wavelength of 590 nm of the second protective layer is preferably 10 nm to 800 nm, and more preferably 40 nm to 800 nm. As described above, by imparting a retardation to the second protective layer, a high contrast ratio may be obtained not only in a front direction but also in an oblique direction when the polarizing plate of the present invention is used in a liquid crystal display apparatus. The second protective layer may be isotropic depending upon the purpose.

Preferably, the slow axis direction of the second protective layer is substantially parallel or perpendicular to the absorption axis direction of the polarizer. The polarizing plate having such a positional relationship of optical axes is used preferably in a normally black mode liquid crystal display apparatus.

In one embodiment, when the polarizing plate of the present invention is used in a liquid crystal cell having a liquid crystal layer aligned homeotropically as in a vertical alignment mode, a refractive index ellipsoid of the second protective layer preferably satisfies a relationship: $nx \geq ny > nz$. In this case, the slow axis direction of the second protective layer preferably is substantially perpendicular to the absorption axis direction of an adjacent polarizer. Further, in this case, the Nz coefficient of the second protective layer is 0.9 to 4. In another embodiment, when the polarizing plate of the present invention is used in a liquid crystal cell having a liquid crystal layer aligned homogeneously as in an in-plane switching mode, a refractive index ellipsoid of the second protective layer preferably satisfies a relationship: $nx \geq nz > ny$. In this case, the slow axis direction of the second protective layer preferably is substantially perpendicular to the absorption axis direction of an adjacent polarizer. Further, in this case, the Nz coefficient of the second protective layer is −0.1 to 0.9.

As a material for forming the second protective layer, any suitable one may be selected. Preferably, the second protective layer contains at least one resin selected from the group consisting of a cellulose-based resin, a norbornene-based resin, a polyimide-based resin, a polyester-based resin, and an acrylic resin. In the present specification, the "resin" may be a single polymer obtained from one kind of monomer or a copolymer obtained from at least two kinds of monomers. The second protective layer contains preferably 60 parts by weight to 100 parts by weight of the resin based on 100 parts by weight of the total solid content.

The cellulose-based resin may be obtained, for example, by a method described in JP 07-112446 A. The norbornene-based resin may be obtained, for example, by a method described in JP 2001-350017 A. The polyimide-based resin may be obtained by a method described in U.S. Pat. No. 5,344,916. The polyester-based resin may be obtained, for example, by a method described in U.S. Pat. No. 6,964,795. The acrylic resin may be obtained, for example, by a method described in JP 2004-198952 A.

As a method of forming the second protective layer, any appropriate forming method may be employed. Examples of the forming method include compression forming, transfer forming, injection forming, extrusion forming, blow forming, powder forming, FRP forming, and solvent casting.

As the second protective layer, a commercially available film may be used as it is. Alternatively, a commercially available film subjected to secondary treatment such as stretching treatment and/or shrinking treatment may be used. Examples of the commercially available film include FUJITAC series (ZRF80S, TD80UF, TDY-80UL (trade name)) manufactured by Fuji Photo Film Co., Ltd., "KC8UX2M" (trade name) manufactured by Konica Minolta Opto, Inc., ZEONOR series manufactured by Optes Inc., and ARTON series manufactured by JSR Corporation.

<E. Production Method>

As a method of producing a polarizing plate of the present invention, any suitable method may be selected. In one embodiment, it is preferred that the polarizing plate of the present invention be produced by the production method including the following steps $A_1$ to $D_1$.

Step $A_1$: the step of preparing a solution that contains a lyotropic liquid crystal and a solvent and exhibits liquid crystallinity.

Step $B_1$: the step of applying the solution prepared in the step $A_1$ on the surface of a long base in one direction to form a solidified layer or cured layer of the lyotropic liquid crystal.

Step $C_1$: the step of forming a mixed resin containing the thermoplastic resin layer (A) and the thermoplastic resin layer (B) into a long film, and stretching the film so that a transmission axis is expressed in a longitudinal direction.

Step $D_1$: the step of laminating the long base obtained in the step $B_1$ and the long film obtained in the step $C_1$ so that the solidified layer or cured layer of the lyotropic liquid crystal is sandwiched by the base and the film, and the longitudinal directions are matched with each other.

According to such a production method, the polarizer having a transmission axis in a longitudinal direction and the first protective layer having a transmission axis in a longitudinal direction may be attached to each other by roll-to-roll, so that the productivity of a polarizing plate may be enhanced greatly.

In another embodiment, the polarizing plate of the present invention is produced preferably by a production method including the following steps $A_2$ to $C_2$.

Step $A_2$: the step of stretching a long film of a polyvinyl alcohol-based resin containing a dichroic pigment in a longitudinal direction.

Step $B_2$: the step of forming a mixed resin containing the thermoplastic resin layer (A) and the thermoplastic resin layer (B) into a long film, and stretching the film so that a transmission axis is expressed in a width direction.

Step $C_2$: the step of laminating the long film obtained in the step $A_2$ and the long film obtained in the step $B_2$ so that the longitudinal directions are matched with each other.

According to such a production method, the polarizer having a transmission axis in a width direction and the first protective layer having a transmission axis in a width direction may be attached to each other by roll-to-roll, so that the productivity of a polarizing plate may be enhanced greatly.

<F. Other Layers>

The polarizing plate of the present invention may further include any constituent member. Referring to FIG. 1, any member may be provided on a side of the second protective layer 22 opposite to a side having the polarizer 10, or on a side of the second protective layer 21 opposite to a side having the polarizer 10.

In one embodiment, an adhesion layer is further provided on a side of the second protective layer 22 opposite to a side having the polarizer 10. When the polarizing plate with the adhesion layer is used, for example, in a liquid crystal display apparatus, the adhesion layer is used for attachment of the polarizing plate to the surface of a liquid crystal cell so that the second protective layer is opposed to the liquid crystal cell.

Although not limited, the adhesion layer preferably has a pressure-sensitive adhesive layer. Generally, a liquid crystal display apparatus is inspected before its shipment. At this time, if defects are found in a polarizing plate itself or foreign matter is put between a polarizing plate and a liquid crystal cell, the polarizing plate is peeled off so as to re-use the liquid crystal cell (which is also called "rework"). The pressure-sensitive adhesive layer is preferably excellent in adhesion and peelability so as to enable rework.

Preferably, the pressure-sensitive adhesive layer contains a pressure-sensitive adhesive that may be obtained by cross-linking a composition containing at least a (meth)acrylate-based (co)polymer, a cross-linking agent containing a compound with an isocyanate group as a main component, and a silane coupling agent.

In another embodiment, a retardation layer is further provided on a side of the second protective layer 22 opposite to a side having the polarizer 10. For example, in the case of using the polarizing plate of the present invention in a liquid crystal display apparatus, a refractive index ellipsoid of the retardation layer is appropriately set depending on a refractive index ellipsoid of a liquid crystal cell to be mounted on the liquid crystal display apparatus. For example, when the polarizing plate of the present invention is used for a liquid crystal cell (in which a refractive index ellipsoid exhibits a relationship: nz>nx=ny) as in a vertical alignment mode, a refractive index ellipsoid of the retardation layer preferably satisfies a relationship: nx=ny>nz (that is, the retardation layer is a negative C plate). Alternatively, when the polarizing plate of the present invention is used for a liquid crystal cell (in which the alignment direction of liquid crystal molecules changes gradually in a thickness direction) as in a bend nematic mode or a twisted nematic mode, the retardation layer is preferably a positive O plate or a negative O plate.

<G. Liquid Crystal Display Apparatus>

The polarizing plate of the present invention is preferably used in a liquid crystal display apparatus. The liquid crystal display apparatus is used, for example, for: OA devices such as a personal computer monitor, a laptop personal computer, and a copying machine; portable devices such as a cellular phone, a watch, a digital camera, a personal digital assistance (PDA), and a portable game machine; household electric appliances such as a video camera, a television, and a microwave oven; in-car devices such as a back monitor, a car navigation system monitor, and a car audio; display devices such as an information monitor for commercial stores; security devices such as a surveillance monitor; and nursing care/medical devices such as a nursing monitor and a medical monitor.

The liquid crystal display apparatus of the present invention is preferably used for a television. The television has a screen size of preferably wide 17-type (373 mm×224 mm) or more, more preferably wide 23-type (499 mm×300 mm) or more, and particularly preferably wide 32-type (687 mm×412 mm) or more.

EXAMPLES

The present invention will be described in more detail by using the following examples and comparative examples. However, the present invention is not limited to the examples. Analysis methods used in the examples are described below.

(1) Transmittance and polarization degree of a polarizer:

The transmittance (T) and polarization degree were determined by using a spectrophotometer "DOT-3" (product name, manufactured by Murakami Color Research Laboratory). The transmittance (T) is a Y value obtained by undergoing luminosity factor correction with Two Degree Field (C light source) under JIS Z 8701-1982.

(2) Method of measuring a dichroic ratio (DR):

Setting the complete polarization obtained through a Glan-Thompsom prism polarizer to be 100%, transmittances: $k_1$ and $k_2$ with respect to each linearly polarized light were obtained using an integrating sphere spectrophotometer ("U-4100" (product name), manufactured by Hitachi Ltd.). A single axis transmittance (Ts) was calculated by an expression: $Ts=(k_1+k_2)/2$. A dichroic ratio (DR) was calculated by an expression: $DR=\log(1/k_2)/\log(1/k_1)$. Herein, $k_1$ represents a transmittance of linearly polarized light in a maximum transmittance direction, and $k_2$ represents a transmittance of linearly polarized light in a direction perpendicular to the maximum transmittance direction.

(6) Method of measuring a thickness:

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C-type" (manufactured by Anritsu Corporation).

(3) Method of measuring retardation values (Re[λ], Rth [λ]), Nz coefficient, and T[590]:

Measurement was performed at 23° C. by using "KOBRA21-ADH" (trade name, manufactured by Oji Scientific Instruments). As the average refractive index, used was a value determined by using an Abbe refractometer "DR-M4" (product name, manufactured by Atago Co., Ltd.).

(8) Method of measuring an absolute value (C[590]) of a photoelastic coefficient:

The retardation values (23° C./wavelength of 590 nm) at the center of a sample having a size of 2 cm×10 cm were measured under stress (5 to 15 N) by using a spectroscopic ellipsometer "M-220" (product name, manufactured by JASCO Corporation) while both ends of the sample were held, and the absolute value (C[590]) of a photoelastic coefficient was calculated from a slope of a function of the stress and the retardation values.

Production of Polarizer

Reference Example 1

A polyvinyl alcohol film ("VF-PS#7500" (product name), manufactured by Kuraray Co., Ltd.) with a thickness of 75 μm was swollen with pure water at 30° C., and thereafter, stretched so that the final stretching magnification became 6.2 times the original length of the film while being dyed in an aqueous solution containing 0.032 parts by weight of iodine and 0.2 parts by weight of potassium iodide with respect to 100 parts by weight of water. The stretched film was dried for one minute at 40° C. in an air circulation type dry oven. A polarizer A thus obtained had a thickness of 25 μm, a transmittance of 42.6%, and a polarization degree of 99.99%.

Reference Example 2

An aqueous solution containing a dichroic pigment ("LC polarizer" (product name), manufactured by Optiva Inc.) containing a sulfonated perylene-based pigment and pure water, in which the concentration of the dichroic pigment was adjusted to 12.2% by weight, was applied to the surface of a triacetylcellulose film with a bar coater, followed by natural drying, whereby a polarizer was produced on the surface. A polarizer B thus obtained had a thickness of 0.2 μm, a single axis transmittance of 42.1%, and a dichroic ratio (at 600 nm) of 35. The aqueous solution exhibited a nematic liquid crystal phase at 23° C. when observed with a polarization microscope.

Production of First Protective Layer

Reference Example 3

A mixed resin containing 75% by weight of polyethylene naphthalate and 25% by weight of syndyotactic polystyrene was subjected to fusion extrusion to form a film having a thickness of 600 μm. The obtained film was stretched in a width direction at 135° C., using a polyester film tenter. The film (first protective layer A) thus obtained had a reflection axis in a width direction and a transmission axis in a mechanical direction, a thickness of 400 μm, $R_{1x}[590]$ of 73%, and reflectance ($R_{1y}[590]$) in a transmission axis direction of 35%.

Production of Second Protective Layer

Reference Example 4

A polymer film ["Zeonor ZF14-100" (product name), manufactured by Optes Inc.] containing a norbornene-based resin having a thickness of 100 μm was stretched 2.7 times in an air circulation type temperature-controlled oven at 150° C. by a fixed-end transverse uniaxial stretching method (a method of stretching a film in a width direction while fixing the film in a longitudinal direction), using a tenter stretching machine. The retardation film (second protective layer A) thus obtained had a refractive index ellipsoid exhibiting a relationship: nx>ny>nz, a thickness of 35 μm, T[590] of 91%, Re[590] of 120 nm, Rth[590] of 160 nm, Nz coefficient of 1.33, and C[590] of $5.1 \times 10^{-12}$ $m^2/N$.

Production of a Retardation Layer

Reference Example 5

The polyimide powder (6FDA/TFMB) was dissolved in methyl isobutyl ketone to prepare 15% by weight of a polyimide solution. The polyimide solution was cast uniformly in a sheet shape on the surface of a triacetyl cellulose film ["TD80UF" (product name), manufactured by Fuji Photo Film Co., Ltd] having a thickness of 80 μm with a slot die coater. Next, the film was provided in an air circulation type dry oven having a multi-chamber, dried at 80° C. for 2 minutes, at 135° C. for 5 minutes, and at 150° C. for 10 minutes, and finally the triacetyl cellulose film was peeled. The polyimide layer (retardation layer A) thus obtained had a refractive index ellipsoid exhibiting a relationship: nx=ny>nz, a thickness of 5 μm, T[590] of 90%, Re[590] of 1 nm, and Rth[590] of 210 nm.

Production of a Polarizing Plate

Example 1

The first protective layer A obtained in Reference Example 3 was attached to one side of the polarizer A produced in Reference Example 1 via a water-soluble adhesive containing a polyvinyl alcohol-based resin ("GOHSEFIMER Z200" (product name), manufactured by Nippon Synthetic Chemical Industry Co., Ltd.) so that the transmission axis direction thereof became substantially parallel to the transmission axis direction of the polarizer A. Next, the second protective layer A produced in Reference Example 4 was attached to the other side of the polarizer A via the water-soluble adhesive so that the slow axis direction thereof became substantially perpendicular to the absorption axis direction of the polarizer A. Next, the retardation layer A obtained in Reference Example 5 was attached to a side of the second protective layer A opposite to the side having the polarizer A via an acrylic pressure-sensitive adhesive. The polarizing plate thus obtained exhibited a contrast ratio higher than that of a conventional polarizing plate, when used in a liquid crystal display apparatus.

INDUSTRIAL APPLICABILITY

As described above, the polarizing plate of the present invention can exhibit a high contrast ratio in the case of being used in a liquid crystal display apparatus, so the polarizing plate is significantly useful for enhancing the display properties of, for example, a liquid crystal television, a personal computer monitor, and a cellular phone.

The invention claimed is:
1. A long polarizing plate, comprising: a long polarizer having a transmission axis in a longitudinal direction and a long first protective layer having a transmission axis in a longitudinal direction and provided on one side of the polarizer,
    wherein the first protective layer has a function of separating incident light into two polarized light components perpendicular to each other, transmitting one polarized light component, and reflecting the other polarized light component;

the polarizer and the first protective layer are laminated so that the longitudinal directions are matched with each other; and the transmission axis direction of the polarizer and the transmission axis direction of the first protective layer are substantially parallel to each other.

2. A long polarizing plate according to claim 1, wherein the polarizer comprises a stretched film of a polyvinyl alcohol-based resin containing a dichroic pigment.

3. A long polarizing plate according to claim 1, wherein the polarizer comprises a solidified layer or a cured layer of an aligned lyotropic liquid crystal.

4. A long polarizing plate according to claim 3, wherein the lyotropic liquid crystal contains an azo-based pigment, an anthraquinone-based pigment, a perylene-based pigment, an indanthrone-based pigment, an imidazole-based pigment, or a mixture thereof.

5. A long polarizing plate according to claim 1, wherein the first protective layer comprises a laminate containing a thermoplastic resin layer (A) and a thermoplastic resin layer (B).

6. A long polarizing plate according to claim 1, wherein the first protective layer comprises the thermoplastic resin layer (A) and the thermoplastic resin layer (B) provided alternately.

7. A long polarizing plate according to claim 5, wherein the thermoplastic resin layer (A) substantially exhibits anisotropy, and the thermoplastic resin layer (B) substantially exhibits isotropy.

8. A long polarizing plate according to claim 5, wherein an in-plane birefringent index ($\Delta n_{xy}$ [590]) at a wavelength of 590 nm of the thermoplastic resin layer (A) is 0.05 or more.

9. A long polarizing plate according to claim 5, wherein a refractive index ($ny_A$) in a fast axis direction of the thermoplastic resin layer (A) and a refractive index ($ny_B$) in a fast axis direction of the thermoplastic resin layer (B) are substantially the same.

10. A long polarizing plate according to claim 5, wherein the thermoplastic resin layer (A) contains a polyethylene terephthalate-based resin, a polytrimethylene terephthalate-based resin, a polybutylene terephthalate-based resin, a polyethylene-naphthalate-based resin, a polybutylene naphthalate-based resin, or a mixture thereof.

11. A long polarizing plate according to claim 5, wherein the thermoplastic resin layer (B) contains a polystyrene-based resin, a polymethyl methacrylate-based resin, a polystyrene glycidyl methacrylate-based resin, or a mixture thereof.

12. A long polarizing plate according to claim 1, further comprising a second protective layer on a side of the polarizer opposite to the side where the first protective layer is provided, wherein an in-plane retardation value (Re[590]) at a wavelength of 590 nm of the second protective layer is 10 nm to 400 nm.

13. A long polarizing plate according to claim 1, further comprising a second protective layer on a side of the polarizer opposite to the side where the first protective layer is provided, wherein a thickness direction retardation value (Rth [590]) at a wavelength of 590 nm of the second protective layer is 10 nm to 800 nm.

14. A long polarizing plate according to claim 1, further comprising a second protective layer on a side of the polarizer opposite to the side where the first protective layer is provided, wherein the second protective layer contains at least one kind of resin selected from the group consisting of a cellulose-based resin, a norbornene-based resin, a polyimide-based resin, a polyester-based resin, and an acrylic resin.

15. A long polarizing plate according to claim 1, further comprising a second protective layer on a side of the polarizer opposite to the side where the first protective layer is provided and an adhesion layer on a side of the second protective layer opposite to a side having the polarizer.

16. A long polarizing plate according to claim 15, further comprising a retardation layer on a side of the second protective layer opposite to a side having the polarizer.

17. A long polarizing plate according to claim 16, wherein the retardation layer has a function of compensating a liquid crystal cell optically.

18. A liquid crystal display apparatus comprising the long polarizing plate according to claim 1.

* * * * *